(12) United States Patent
Hirakata et al.

(10) Patent No.: US 6,334,094 B1
(45) Date of Patent: Dec. 25, 2001

(54) ENGINE SPEED CALCULATION APPARATUS

(75) Inventors: Yoshiaki Hirakata; Masahiko Abe; Yasuo Iwata, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,910

(22) Filed: Jun. 25, 1999

(30) Foreign Application Priority Data

Jun. 26, 1998 (JP) .................................................. 10-180171

(51) Int. Cl.⁷ ................................ G01P 3/00; G06F 15/00
(52) U.S. Cl. ............................................ 702/145; 73/117.3
(58) Field of Search ................................. 702/33, 44, 57, 702/79, 78, 96, 113, 114, 127, 142, 145–149, 150, 151, 176–178, 182–184; 701/102, 110, 114; 73/117.3, 116, 117.2

(56) References Cited

U.S. PATENT DOCUMENTS

| | | | | |
|---|---|---|---|---|
| 4,136,558 | * | 1/1979 | Lukes et al. ........................ | 73/119 A |
| 4,779,214 | * | 10/1988 | Kinugasa ............................ | 702/147 |
| 5,111,405 | * | 5/1992 | Maeda et al. ....................... | 701/110 |
| 5,373,732 | * | 12/1994 | Kuroda et al. ...................... | 73/117.3 |
| 5,415,035 | * | 5/1995 | Shimasaki et al. ................. | 73/117.3 |
| 5,689,065 | * | 11/1997 | Kuroda et al. ...................... | 73/117.3 |
| 5,747,681 | * | 5/1998 | Kuroda et al. ...................... | 73/117.3 |

FOREIGN PATENT DOCUMENTS

| | | |
|---|---|---|
| 59226870A | 12/1984 | (JP) . |
| 61137071A | 6/1986 | (JP) . |
| 61277845 | 12/1986 | (JP) . |
| 9264241 | 10/1997 | (JP) . |

\* cited by examiner

*Primary Examiner*—Hal Wachsman
*Assistant Examiner*—Demetrius Pretlow
(74) *Attorney, Agent, or Firm*—Birch, Stewart, Kolasch & Birch, LLP

(57) ABSTRACT

To provide an engine speed calculation apparatus which can facilitate calculation processing of the engine speed without being influenced by pulsation rotation in a low speed region of an engine. In a low speed region of an engine, a predetermined value is divided by a time required for rotation over an angle equal to a plurality of times of a predetermined angle to calculate the engine speed, but in a high speed region of the engine in which pulsation occurs less likely, the predetermined value is divided by the value equal to the plurality of times of the time required for rotation over the predetermined angle to calculate the engine speed.

12 Claims, 7 Drawing Sheets

ENGINE SPEED CALCULATION APPARATUS

BACKGROUND OF THE INVENTION

1. Field of the Invention

This invention relates to an engine speed calculation apparatus for calculating a speed of an engine.

2. Description of Background Art

Conventionally, in calculation of an engine speed, a time required for rotation of a crankshaft over a predetermined angle is measured, and an engine speed is determined in accordance with the required time. More particularly, a required time corresponding to 360 degrees as a predetermined angle is measured from generation timings of crank pulses obtained from a crank angle sensor, and a reciprocal number to the required time is multiplied, for example, by 60 to calculate the engine speed. The engine speed calculated in this manner is used as a principal engine operation parameter in engine control such as fuel injection control (for example, refer to Japanese Patent Laid-Open No. Sho. 61-277845 and Japanese Patent Laid-Open No. Hei. 9-264241).

However, in a low speed region wherein the engine speed is low, even when the engine speed should be kept constant, the engine speed pulsates when compared with that in a high speed region, therefore, if the engine speed is calculated using a time required for rotation only over an angle equal to that in the high speed region, an engine speed which is influenced by the pulsating rotation is calculated, and successively calculated engine speeds are fluctuated up and down. If a calculated engine speed influenced by pulsation rotation in this manner is used for engine control, then smooth engine control cannot be achieved. This subject is more conspicuous with an engine in which explosion occurs at non-uniform intervals such as a V-type engine.

For example, in the case of an L-type four-cylinder engine in which ordinary uniform interval explosion is performed, explosion of one cylinder is performed every 180 degrees of rotation of the crankshaft, and the explosion is repeated in the order of a first cylinder, a third cylinder, a second cylinder and a fourth cylinder as shown in (a) of FIG. 1. Further, as shown in (b) of FIG. 1, different strokes, that is, an expansion stroke, an exhaust stroke, an intake stroke and a compression stroke are performed in synchronism with one another at intervals of 180 degrees in the crank angle for all cylinders, and further, the strokes of the first to fourth cylinders for 180 degrees in crank angle are different strokes from each other over 720 degrees in crank angle. Consequently, within a period of any interval of 180 degrees, each of an expansion stroke, an exhaust stroke, an intake stroke and a compression stroke is performed by one of the four cylinders, and a same stroke is not performed simultaneously by a plurality of cylinders. In other words, an expansion stroke which accelerates rotation of the crankshaft because the piston is pushed by an explosion pressure and an expansion stroke which decelerates the rotation of the crankshaft because the intake mixture is compressed are performed simultaneously at an interval of 180 degrees and the balance is kept comparatively well, and thus the rotation of the crankshaft is averaged. Consequently, calculation of the engine speed is less liable to be influenced by pulsating rotation, except a variation among the cylinders.

On the other hand, in the case of a V-type four-cylinder engine in which non-uniform interval explosion occurs, although explosion is repeated in order of a first cylinder, a third cylinder, a second cylinder and a fourth cylinder as shown in (a) of FIG. 2, if explosion of the first cylinder occurs at 0 degree of the crank angle, then the crank angle from the explosion of the first cylinder to the explosion of the third cylinder is 180 degrees; the crank angle from the explosion of the third cylinder to the explosion of the second cylinder is 270 degrees; the crank angle from the explosion of the second cylinder to the explosion of the fourth cylinder is 180 degrees; and the crank angle from the explosion of the fourth cylinder to the explosion of the first cylinder is 90 degrees. This is because, although the different strokes, that is, the expansion stroke, exhaust stroke, intake stroke and compression stroke, are performed at intervals of 180 degrees in the crank angle in each of the cylinders as shown in (b) of FIG. 2, the first and third cylinders and the second and fourth cylinders are displaced by 90 degrees in variation positions between the strokes. Therefore, in a period of one cycle within which the crankshaft rotates twice from 0 degree to 720 degrees in the crank angle, the number of times for an explosion is greater in a period of the latter half rotation from 360 degrees to 720 degrees of the crank angle than that of the former half rotation from 0 degree to 360 degrees of the crank angle, and there is a period of 270 degrees present from the point in time of the explosion of the third cylinder to the explosion of the second cylinder. Therefore, immediately prior to the explosion of the second cylinder, the rotation of the crankshaft is in a deceleration tendency. On the contrary, since the period from the point in time of the explosion of the fourth cylinder to the explosion of the first cylinder is as short as 90 degrees, before and after the explosion of the first cylinder, the rotation of the crankshaft is in an acceleration tendency. Further, in the period of 0 to 90 degrees (the period indicated by reference symbol A) within the one cycle, expansion strokes occur in an overlapping relationship with the first cylinder and the fourth cylinder to each other and the acceleration of rotation of the crankshaft is in an increasing tendency. Further, in the period from 360 degrees to 450 degrees (the period indicated by reference symbol B), the expansion stroke occurs with none of the cylinders and the compression stroke occurs only with the second stroke, and consequently, the rotation of the crankshaft is in a deceleration tendency. As a result, in the case of an engine in which non-uniform interval explosion occurs, such as a V-shaped four-cylinder engine as described above, pulsation of the engine rotation is different between a period of a first half rotation from 0 degrees to 360 degrees of the crank angle and another period of a second half rotation from 360 degrees to 720 degrees of the crank angle, and particularly in a low speed region, the calculation of the engine speed is liable to be influenced by the pulsation of rotation.

Consequently, if it is tried to perform calculation processing while calculation of the engine speed is not influenced by pulsation of rotation in a low speed region, then there is the possibility that the calculation processing may be complicated.

SUMMARY AND OBJECTS OF THE INVENTION

Therefore, the object of the present invention resides in the provision of an engine speed calculation apparatus which can facilitate calculation processing of the engine speed without being influenced by the pulsation of rotation in a low speed region of an engine.

According to the present invention, an engine speed calculation apparatus which measures a time required for rotation over a predetermined angle each time a crankshaft of an engine rotates over the predetermined angle and calculates an engine speed in accordance with the required time includes a discrimination means for discriminating whether or not the calculated engine speed is lower than a predetermined speed, and a calculation means for dividing, when the engine speed calculated in the preceding cycle is lower than the predetermined speed, a predetermined value by a time required for rotation over an angle equal to a plurality of times of the predetermined angle to calculate the engine speed, but dividing, when the engine speed calculated in the preceding cycle is equal to or higher than the predetermined speed, the predetermined value by a value equal to a plurality of times of the time required for rotation over the predetermined angle to calculate the engine speed.

In particular, according to the present invention, since, in the low speed region of the engine, the predetermined value is divided by a time required for rotation over the angle equal to the plurality of times of the predetermined angle to calculate the engine speed, but in the high speed region of the engine in which pulsation occurs less likely, the predetermined value is divided by the value equal to the plurality of times of the time required for rotation over the predetermined angle to calculate the engine speed, so that the engine speed can be calculated without being influenced by pulsation rotation, and such a calculation expression can be used commonly for calculation of the engine speed in both of the low speed region and the high speed region of the engine, by which calculation processing of the engine speed is facilitated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, embodiments of the present invention are described in detail with reference to the drawings.

Figure 1A:
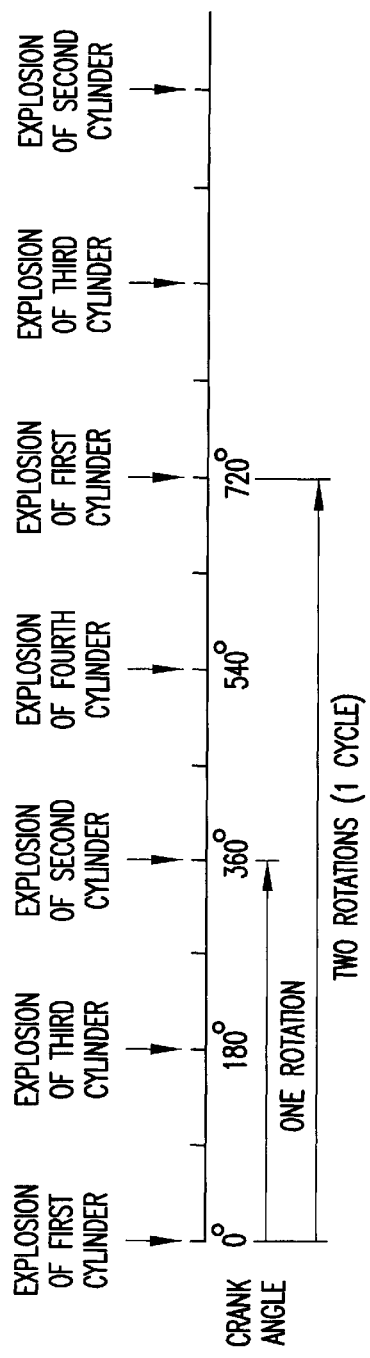
FIG. 1 is a view illustrating the points in time of the explosion and stroke periods of individual cylinders of an L-type four-cylinder engine.
Figure 1B:
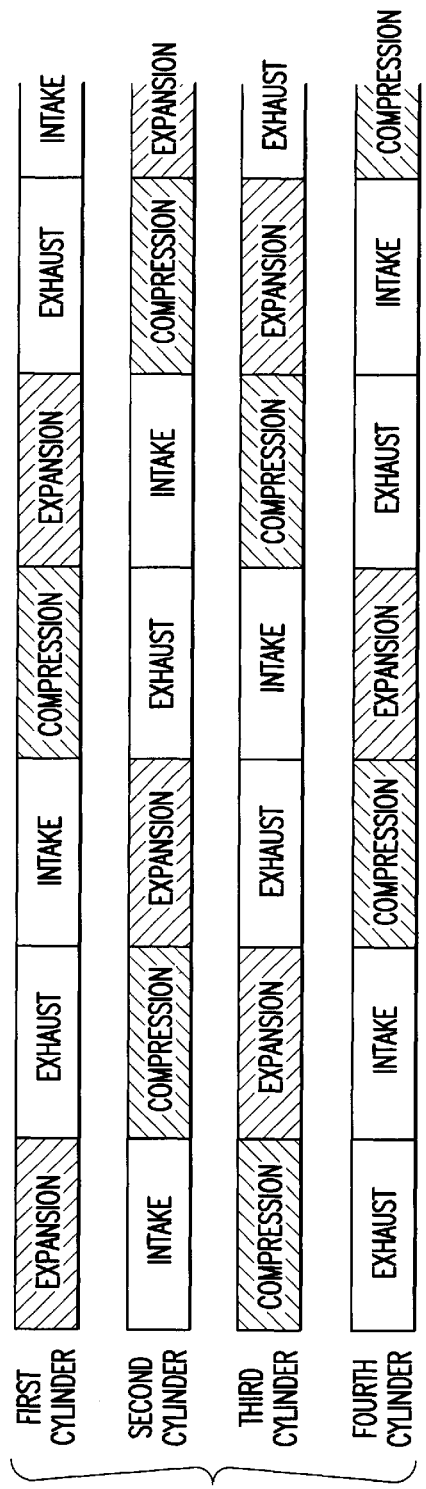
Figure 2A:
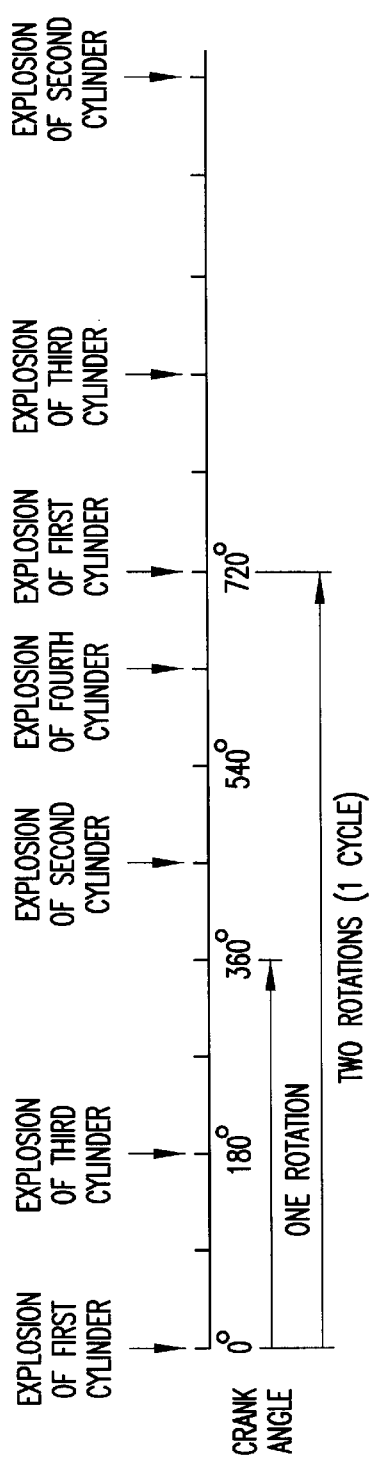
FIG. 2 is a view illustrating the points in time of the explosion and stroke periods of individual cylinders of a V-type four-cylinder engine.
Figure 2B:
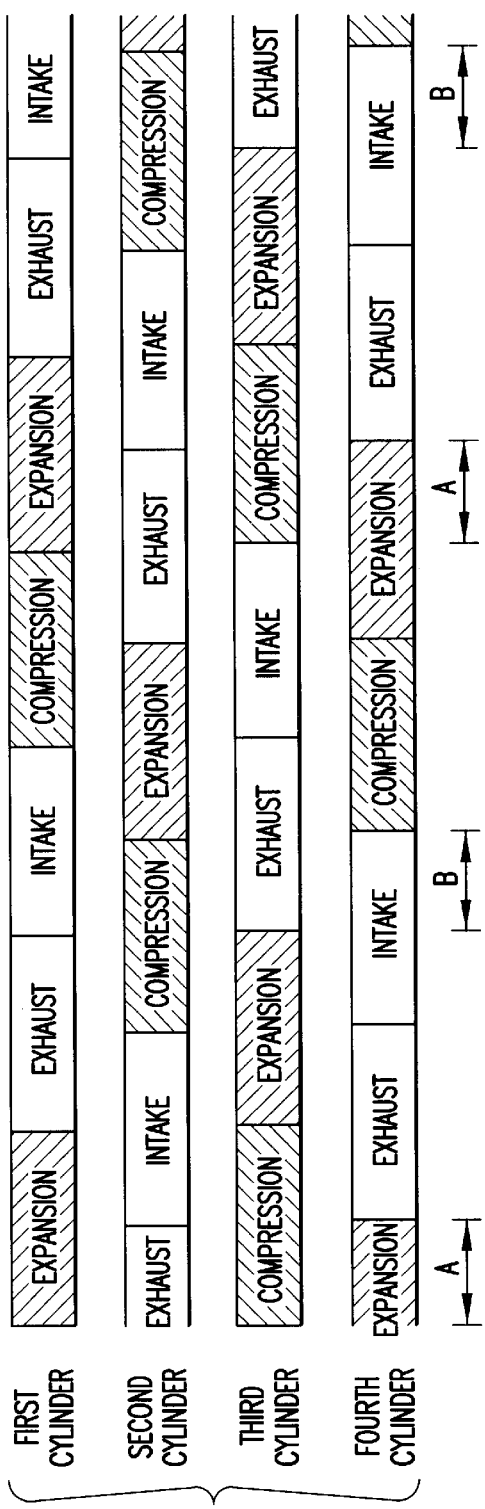
Figure 3:
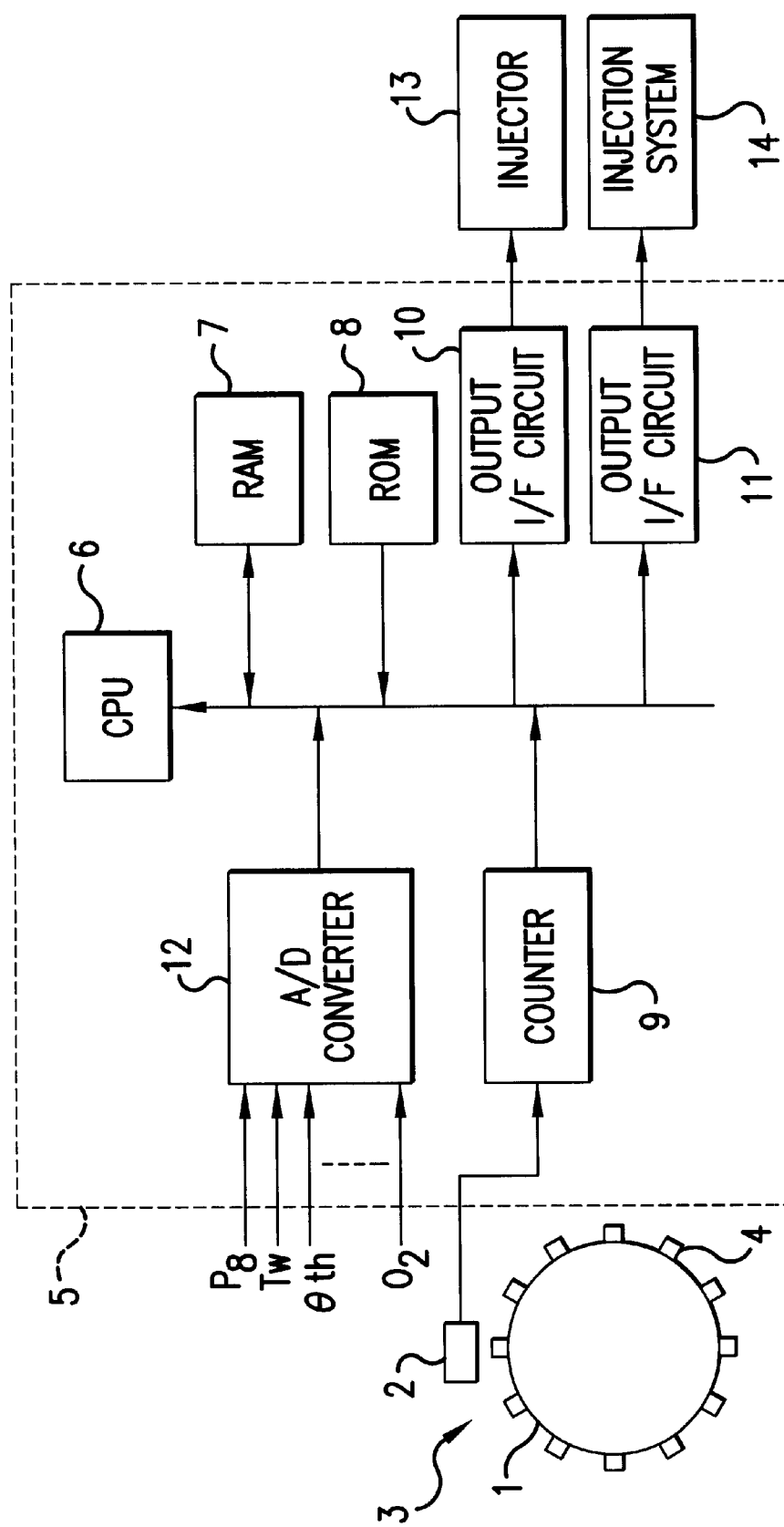
FIG. 3 is a block diagram showing an embodiment of the present invention.

FIG. 3 shows an engine control system to which an engine speed calculation apparatus according to the present invention is applied. In the present engine control system, a crank angle sensor 3 including a rotary member 1 and an electromagnetic pickup 2 is used. The rotary member 1 is in the form of a disk provided on a crankshaft (not shown) of a four-cycle internal combustion engine and is rotated by rotation of the crankshaft. Twelve projections 4 made of a magnetic material are successively provided as detected portions at intervals of 30 degrees on an outer periphery of the rotary member 1. The electromagnetic pickup 2 is disposed in the proximity of the outer periphery of the rotary member 1. When the rotary member 1 rotates and one of the projections 4 comes close to the electromagnetic pickup 2, a crank pulse is generated from the electromagnetic pickup 2.

An ECU (Electric Control Unit: electronic control unit) 5 is connected to an output of the electromagnetic pickup 2. The ECU 5 includes a CPU 6, a RAM 7, a ROM 8, a counter 9, output interface circuits 10 and 11, and an A/D converter 12. The counter 9 is reset with a crank pulse outputted from the electromagnetic pickup 2 and counts clock pulses outputted from a clock generator not shown, and obtains a time Me of the generation interval of crank pulses by counting the number of generated clock pulses. The CPU 6 performs interrupt processing in response to a rising edge of a crank pulse. It is to be noted that the CPU 6, RAM 7, ROM 8, counter 9, output interface circuits 10 and 11, and A/D converter 12 are all connected commonly to a bus.

The A/D converter 12 is provided to convert analog signals from a plurality of sensors for detecting engine operation parameters such as an intake pipe internal pressure PB, a cooling water temperature TW, a throttle opening $\theta_{th}$ and an oxygen concentration $O_2$ in the exhaust gas, which are necessary for engine control, into digital signals. The CPU 6 determines a fuel injection amount and an ignition timing using the engine operation parameters and an engine speed Ne calculated by the operation which will be hereinafter described, generates an injector driving instruction in order to command fuel injection by the amount of fuel injection and generates an ignition timing signal indicating an ignition timing.

The output interface circuit 10 drives an injector 13 in response to an injector driving instruction from the CPU 6. The injector 13 is provided in the proximity of an intake port of each intake pipe of the internal combustion engine and injects fuel when being driven. The output interface circuit 11 activates an ignition system 14 in response to an ignition timing signal from the CPU 6.

In such a construction as described above, the CPU 6 executes a Me detection operation and a Ne calculation operation in accordance with an interrupt processing routine stored in advance in the ROM 8 in order to calculate the engine speed Ne.

Figure 4:
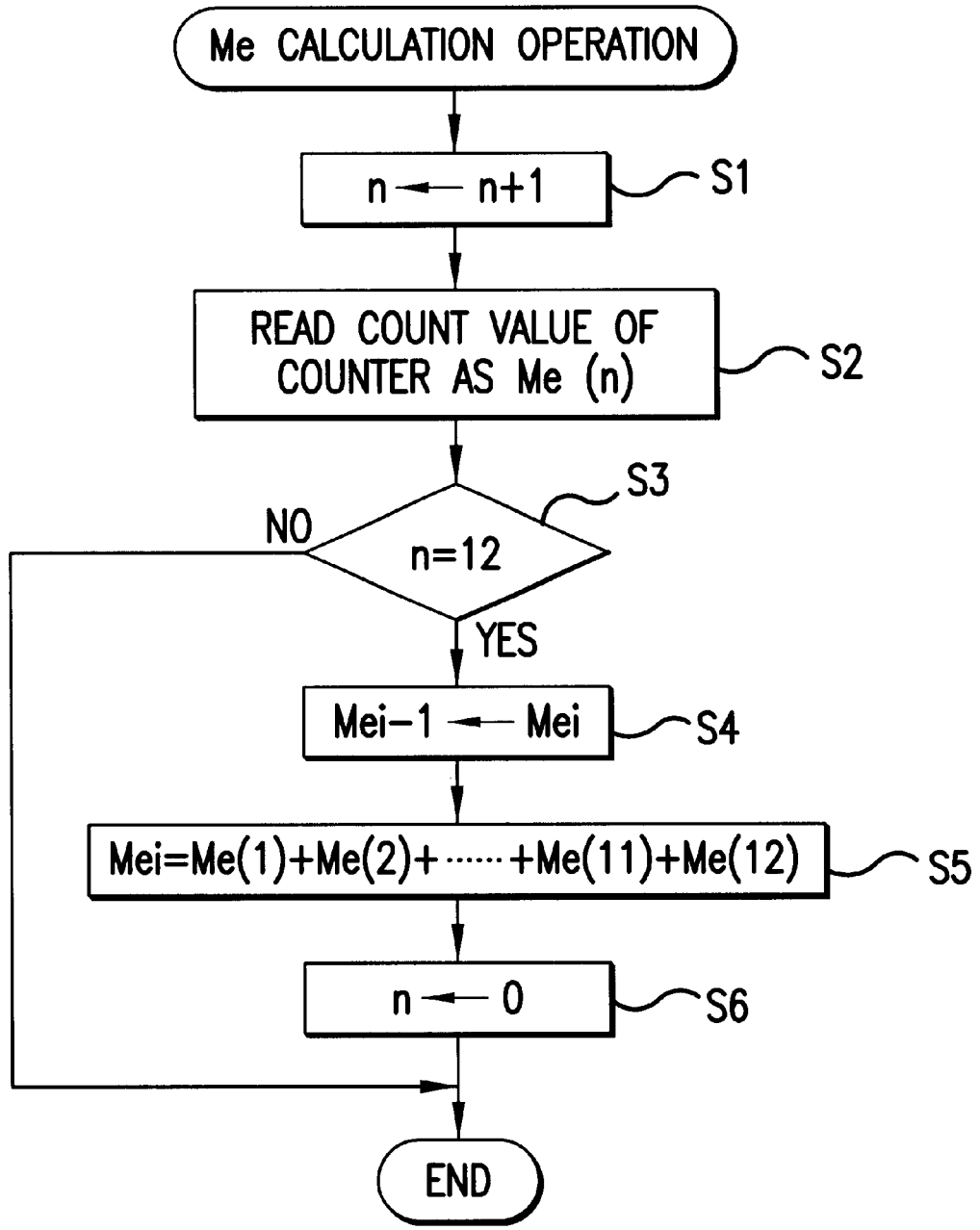
FIG. 4 is a flow chart illustrating an Me calculation operation routine.

The Me calculation operation is an operation of calculating a time $Me_i$ within which the crankshaft, that is, the rotary member 1, rotates 360 degrees. The CPU 6 performs a Me calculation operation as illustrated in FIG. 4 in accordance with the interrupt processing routine in response to a rising edge of a crank pulse outputted from the crank angle sensor 3. In particular, the CPU 6 first adds 1 to a variable n (step S1) and reads and stores a count value of the counter 9 as a time Me(n) [sec] (step S2). The initial value of the variable n is 0. When n=1, the time Me(n) is Me(1). After execution of step S2, the CPU 6 discriminates whether or not the variable n is equal to 12 (step S3). If n≠12, the Me calculation operation is ended. If n=12, the $Me_i$ measured in the present cycle by the present point of time is set to the time $Me_{i-1}$ of the preceding cycle (step S4), whereafter the CPU 6 adds all of Me(1) to Me(12) as given by the following expression to calculate the time $Me_i$ [sec] of the present cycle and stores it into the RAM 7 (step S5).

$$Me_i = Me(1) + Me(2) + \ldots + Me(11) + Me(12) \quad \text{[Expression 1]}$$

After execution of step S5, the CPU 6 resets the variable n to 0 (step S6) and ends the Me calculation operation.

It is to be noted that, since a TDC signal which also indicates a point in time when reaching the top dead center of the piston in a particular cylinder is usually outputted from the crank angle sensor 3, the variable n may be reset to 0 in response to the TDC signal.

Figure 5:
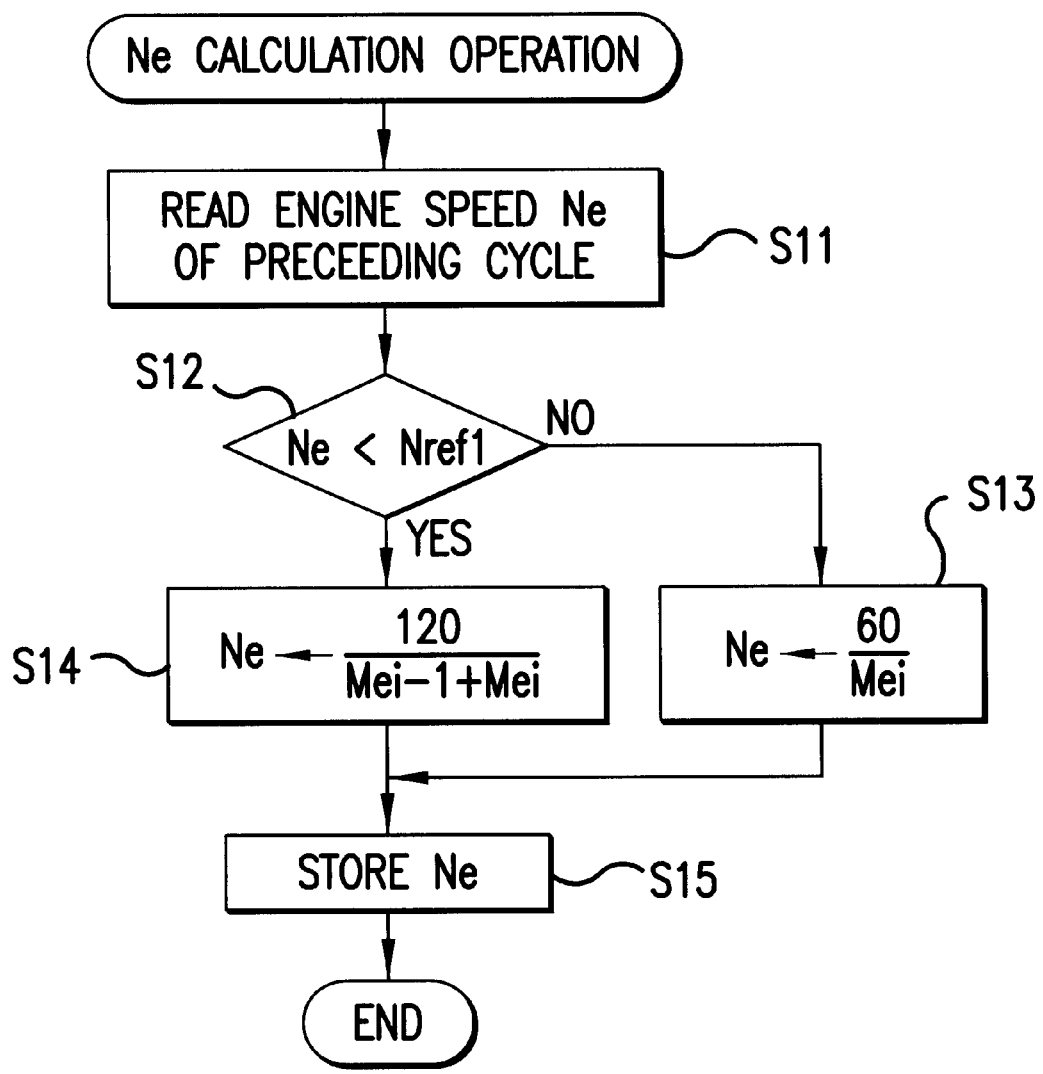
FIG. 5 is a flow chart illustrating an Ne calculation operation routine.

Meanwhile, the Ne calculation operation is executed as an interrupt processing routine by the CPU 6 at a timing of each one rotation of the crankshaft synchronized with the TDC signal described above, or when an event in which the engine speed Ne is required occurs. The CPU 6 first reads out, as shown in FIG. 5, the engine speed Ne calculated in the preceding cycle by the present Ne calculation operation (step S11) and discriminates whether or not the engine speed Ne is lower than a predetermined speed Nref1 (for example, 5,000 [rpm]) (step S12). If Ne≧Nref1, then the CPU 6 calculates the engine speed Ne [rpm] in accordance with a calculation expression of 60/$Me_i$ (step S13). If Ne<Nref1, then the CPU 6 calculates the engine speed Ne [rpm] in accordance with a calculation expression of 120/($Me_{i-1}$+$Me_i$) (step S14). The engine speed Ne calculated in step S13 or S14 is stored into the RAM 7 (step S15) to be read out in step S11 in the next present Ne calculation operation.

It is to be noted that the units of 60 and 120 in steps S13 and S14 are in second.

Where the engine speed Ne calculated in the preceding cycle is a high speed, equal to or higher than the predetermined speed Nref1, the engine speed Ne is newly calculated from the time $Me_i$ [sec] required for the crankshaft to make one rotation. On the other hand, if the engine speed Ne calculated in the preceding cycle is a low speed, lower than the predetermined speed Nref1, then the engine speed Ne is newly calculated from the time $Me_{i-1}$+$Me_i$ [sec] required for the crankshaft to make two rotations.

In the embodiment described above, the calculation operation of the engine speed Ne is performed, in both of a high speed of Ne≧Nref1 and a low speed of Ne<Nref1, every one rotation of the crankshaft irrespective of the rotational period used for the calculation, either long or short. As an alternative, however, in a high speed of Ne≧Nref1, the engine speed Ne may be calculated each time the crankshaft makes one rotation, but in a low speed of Ne<Nref1, the engine speed Ne may be calculated every two rotations of the crankshaft.

As another alternative, after the latest engine speed Ne(n) is calculated every one rotation of the crankshaft, in a high speed of Ne>Nref1, the latest engine speed Ne(n) may be determined as the engine speed Ne, but in a low speed of Ne<Nref1, an average value of the engine speed Ne(n) and the engine speed Ne(n−1) prior by one rotation may be determined as the engine speed Ne.

Further, in the embodiment described above, while the time Me(n) is measured every 30 degrees of rotation of the crankshaft and the time Me(n) is added by a number of times corresponding to a period within which the crankshaft makes one rotation to calculate $Me_i$, the time $Me_i$ within which the crankshaft rotates one rotation may be successively measured in synchronism with the TDC signal of the particular cylinder.

Figure 6:
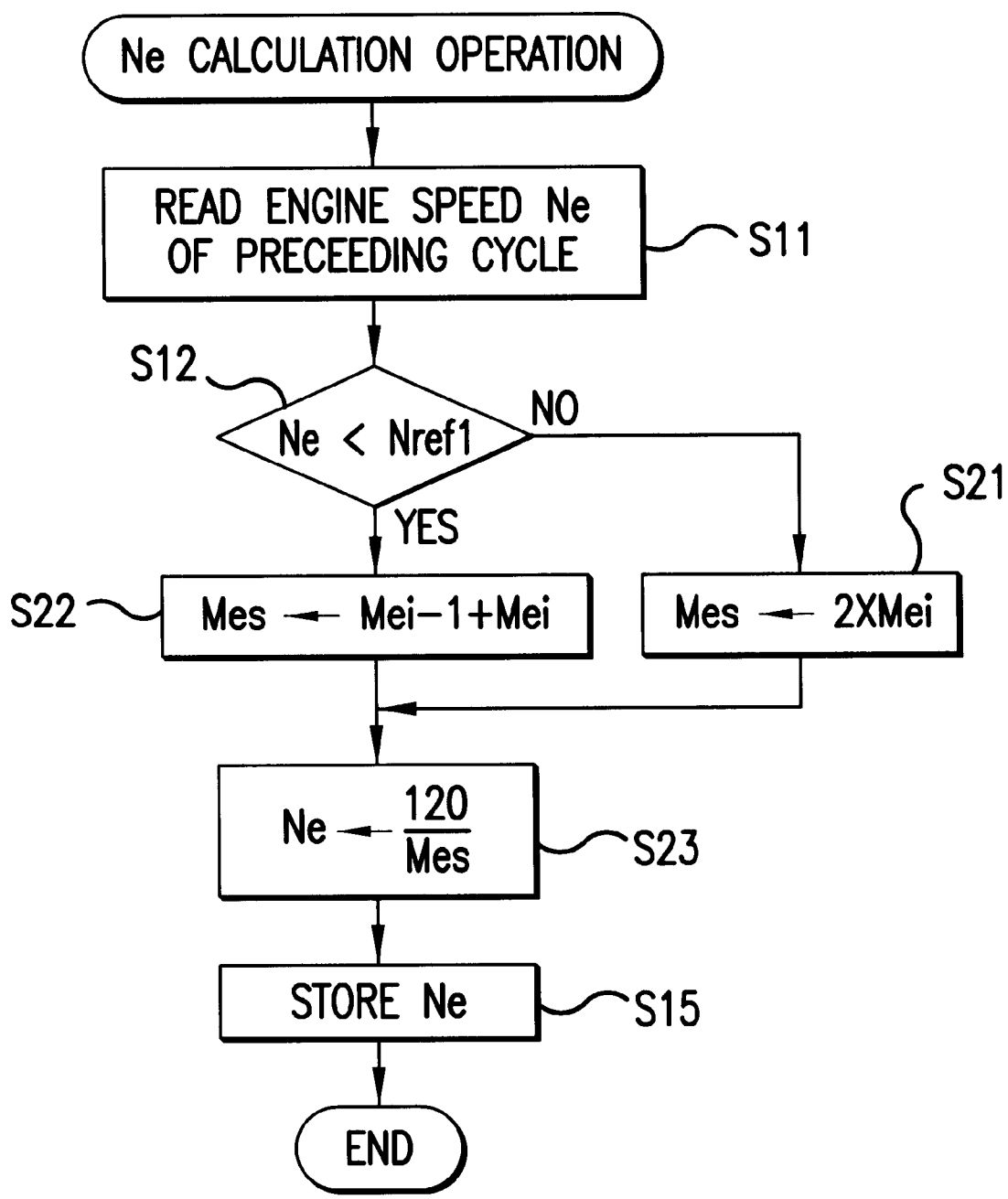
FIG. 6 is a flow chart illustrating another Ne calculation operation routine.

Furthermore, if a common expression for calculation of the engine speed Ne is used for a high speed and a low speed and ($Me_{i-1}$+$Me_i$) is substituted into the calculation expression when the speed is low, whereas (2$Me_i$) is substituted into the calculation expression when the speed is high, then calculation of the division to obtain the engine speed Ne can be performed commonly for a low speed and a high speed. In particular, as shown in FIG. 6, the CPU 6 executes steps S11 and S12 similarly as in the Ne calculation operation illustrated in FIG. 5, and if a result of the discrimination in step S12 indicates a high speed of Ne≧Nref1, the CPU 6 sets twice the time $Me_i$ of the present cycle to a time Mes (step S21), but if the result of the discrimination in step S12 indicates a low speed of Ne<Nref1, the CPU 6 adds the time $Me_{i-1}$ of the preceding cycle and the time $Me_i$ of the present cycle and sets the sum to the time Mes (step S22). The CPU 6 calculates the engine speed Ne [rpm] using the time Mes calculated in step S21 or S22 in accordance with 120/Mes (step S23), whereafter it advances its control to step S15, in which it stores the engine speed Ne into the RAM 7.

Figure 7:
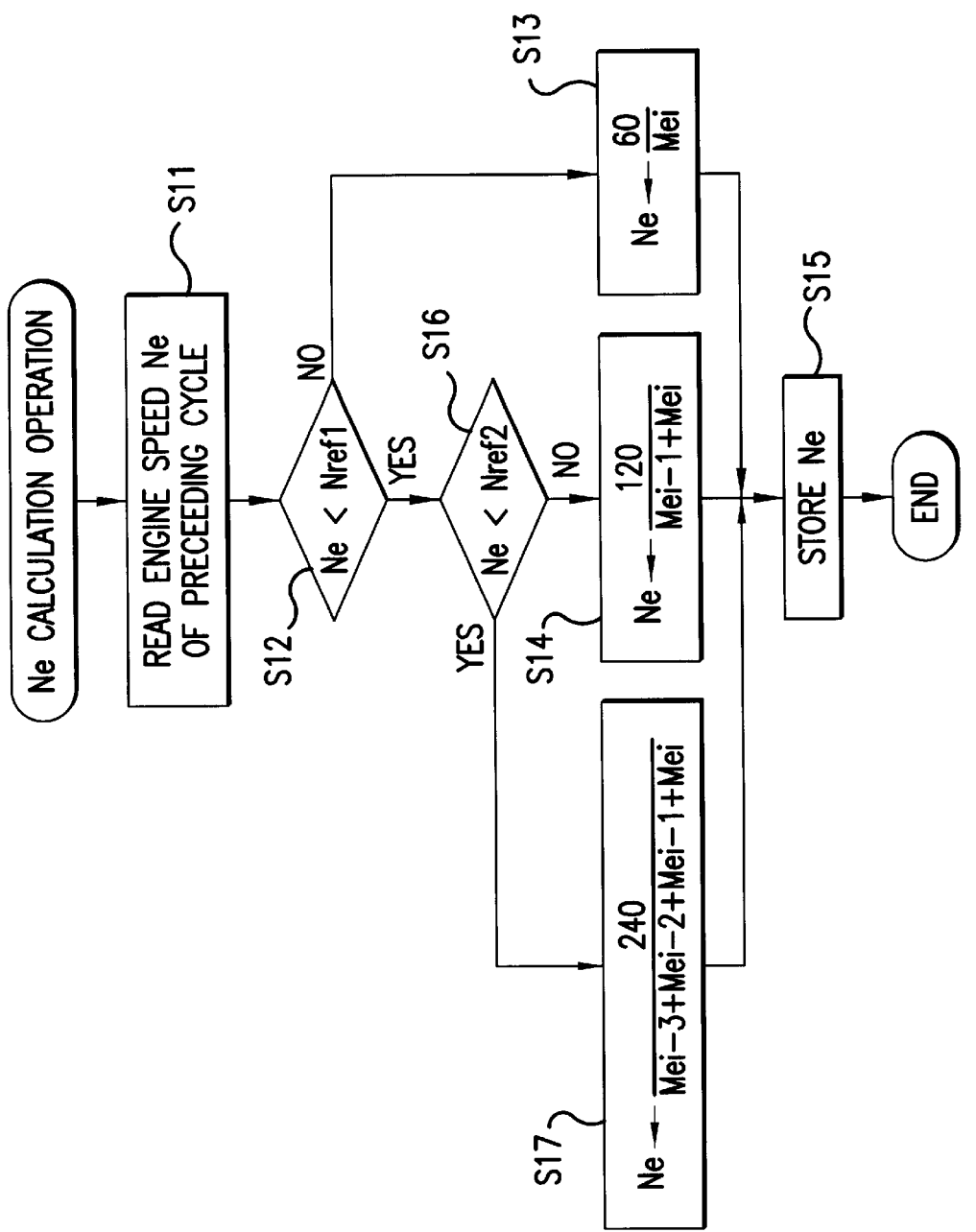
FIG. 7 is a flow chart illustrating a further Ne calculation operation routine.

FIG. 7 illustrates an Ne calculation operation as another embodiment of the present invention. Like portions in the Ne calculation operation of FIG. 7 to those of the Ne calculation operation illustrated in FIG. 5 are denoted by like reference symbols. The CPU 6 discriminates, when Ne<Nref1 is discriminated in step S12, whether or not the engine speed Ne read out in step S11 is lower than a predetermined speed Nref2 (for example, 1,000 [rpm]) (step S16). If Ne≧Nref2, that is, if Nref2≦Ne<Nref1, the control advances to step S14, in which the CPU 6 calculates the engine speed Ne [rpm] in accordance with 120/($Me_{i-1}$+$Me_i$). If Ne<Nref2, then the CPU 6 calculates the engine speed Ne [rpm] in accordance with a calculation expression of 240/($Me_{i-3}$+$Me_{i-2}$+$Me_{i-1}$+$Me_i$) (step S17). Each of $Me_{i-3}$, $Me_{i-2}$, $Me_{i-1}$ and $Me_i$ is a time required for one rotation of the crankshaft calculated by the Me calculation operation. It is to be noted that, in the case of the present embodiment, in the Me calculation operation, not only the time $Me_i$ of the present cycle and the time $Me_{i-1}$ of the preceding cycle (time prior by one cycle) are required to be stored, but also the time $Me_{i-2}$ prior by two cycles and the time $Me_{i-3}$ prior by three cycles are required to be stored.

In this manner, in the embodiment of FIG. 7, when the engine speed Ne calculated in the preceding cycle is a high speed equal to or higher than the predetermined speed Nref1, the engine speed Ne is newly calculated from the time $Me_i$ [sec] required for the crankshaft to make one rotation. If the engine speed Ne calculated in the preceding cycle is a low speed, lower than the predetermined speed Nref1 but equal to or higher than the predetermined speed Nref2, the engine speed Ne is newly calculated from the time $Me_{i-1}$+$Me_i$ [sec] required for the crankshaft to make two rotations. If the engine speed Ne calculated in the preceding cycle is a low speed, further lower than the predetermined speed Nref2, then the engine speed Ne is newly calculated from the time $Me_{i-3}$+$Me_{i-2}$+$Me_{i-1}$+$Me_i$ required for the crankshaft to make four rotations.

As described above, according to the present invention, since, in a low speed region of an engine, a predetermined value is divided by a time required for rotation over an angle equal to a plurality of times of a predetermined angle to calculate an engine speed, but in a high speed region of the engine in which pulsation occurs less likely, the predetermined value is divided by a value equal to a plurality of times of a time required for rotation over the predetermined angle to calculate an engine speed, the engine speed can be calculated without being influenced by pulsation rotation and a calculation expression can be used commonly for calculation of the engine in the low speed region and the high speed region of the engine, by which calculation processing of the engine speed is facilitated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine speed calculation apparatus for measuring a time required for rotation over a predetermined angle each time a crankshaft of an engine rotates over the predetermined angle and calculates an engine speed in accordance with the required time comprising:

a discrimination means for determining if the calculated engine speed is lower than a predetermined speed; and a calculation means for dividing, when the engine speed calculated in the preceding cycle is lower than the predetermined speed, a predetermined value, by a time required for rotation over an angle equal to a plurality of times of the predetermined angle to calculate the engine speed, but dividing, when the engine speed calculated in the preceding cycle is equal to or higher than the predetermined speed, the predetermined value, by a value equal to a plurality of times of the time required for rotation over the predetermined angle to calculate the engine speed.

2. The engine speed calculation apparatus according to claim 1, wherein the calculation means calculates a time within which a crankshaft will rotate 360° and executes as an interrupt processing routine a timing of each rotation of the crankshaft with a top dead center signal of a piston in a particular cylinder to permit a determination if the engine speed is lower than a predetermined speed.

3. The engine speed calculation apparatus according to claim 2, wherein the time of rotation of the crankshaft is measured every 30 degrees of rotation of the crankshaft and each time internal is added to measure the total time for rotation of the crankshaft by 360° to permit synchronism with the top dead center signal of a particular cylinder.

4. The engine speed calculation apparatus according to claim 3, wherein twelve time internals, Me, are measured for one rotation of the crankshaft to determine the time of rotation, during a high speed $2Me_i$ is substituted into the calculation expression and during a low speed $(Me_{i-1}+Me_i)$ is substituted into the calculation expression for calculating the engine speed Ne.

5. The engine speed calculation apparatus according to claim 4, wherein the engine speed is compared to the predetermined value for calculating the engine speed during a low speed.

6. The engine speed calculation apparatus according to claim 4, wherein the engine speed is compared to the predetermined value for calculating the engine speed during a high speed.

7. An engine speed calculation apparatus for measuring a time required for rotation over a predetermined angle each time a crankshaft of an engine rotates over the predetermined angle and calculates an engine speed in accordance with the required time comprising:

a discrimination means for determining if the calculated engine speed is lower than a predetermined speed;

a calculation means for dividing, when the engine speed calculated in the preceding cycle is lower than the predetermined speed, a predetermined value, by a time required for rotation over an angle equal to a plurality of times of the predetermined angle to calculate the engine speed, but dividing, when the engine speed calculated in the preceding cycle is equal to or higher than the predetermined speed, the predetermined value, by a value equal to a plurality of times of the time required for rotation over the predetermined angle to calculate the engine speed; and a control means for controlling an injector for providing a predetermined quantity of fuel based on the engine speed.

8. The engine speed calculation apparatus according to claim 7, wherein the calculation means calculates a time within which a crankshaft will rotate 360° and executes as an interrupt processing routine a timing of each rotation of the crankshaft with a top dead center signal of a piston in a particular cylinder to permit a determination if the engine speed is lower than a predetermined speed.

9. The engine speed calculation apparatus according to claim 8, wherein the time of rotation of the crankshaft is measured every 30 degrees of rotation of the crankshaft and each time internal is added to measure the total time for rotation of the crankshaft by 360° to permit synchronism with the top dead center signal of a particular cylinder.

10. The engine speed calculation apparatus according to claim 9, wherein twelve time internals, Me, are measured for one rotation of the crankshaft to determine the time of rotation, during a high speed $2Me_i$ is substituted into the calculation expression and during a low speed $(Me_{i-1}+Me_i)$ is substituted into the calculation expression for calculating the engine speed Ne.

11. The engine speed calculation apparatus according to claim 10, wherein the engine speed is compared to the predetermined value for calculating the engine speed during a low speed.

12. The engine speed calculation apparatus according to claim 10, wherein the engine speed is compared to the predetermined value for calculating the engine speed during a high speed.

* * * * *